United States Patent
Huppi et al.

(10) Patent No.: US 6,658,577 B2
(45) Date of Patent: Dec. 2, 2003

(54) BREATHING STATUS LED INDICATOR

(75) Inventors: Brian Q. Huppi, Cupertino, CA (US); Christopher J. Stringer, Pacifica, CA (US); Jory Bell, San Francisco, CA (US); Christopher L. Capener, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/197,542

(22) Filed: Jul. 15, 2002

(65) Prior Publication Data

US 2002/0178388 A1 Nov. 28, 2002

Related U.S. Application Data

(63) Continuation of application No. 09/332,242, filed on Jun. 14, 1999.

(51) Int. Cl.[7] ............... G06F 1/26; G06F 1/28

(52) U.S. Cl. ........................................ 713/323; 713/320
(58) Field of Search ................................. 713/300–340

(56) References Cited

U.S. PATENT DOCUMENTS

| | | | | |
|---|---|---|---|---|
| 5,608,225 A | * | 3/1997 | Kamimura et al. | 250/458.1 |
| 5,659,465 A | * | 8/1997 | Flack et al. | 363/71 |
| 6,153,985 A | * | 11/2000 | Grossman | 315/291 |

* cited by examiner

*Primary Examiner*—Rupal Dharia

(57) ABSTRACT

A new and improved status LED indicator provides a pleasing visual appeal. An embodiment of the present invention includes a sleep-mode indicator for laptop computers. The LED indicator is energized by pulse-width modulated electrical pulses. The effect of these pulses on the indicator varies in intensity and mimics a rhythm typical of breathing. It is another aspect of the invention to provide an electrical apparatus that generates a sleep-mode indicator blinking pattern based on a sinusoidal function using PWM (pulse width modulation) designs.

9 Claims, 3 Drawing Sheets

BREATHING STATUS LED INDICATOR

This is a continuation of application Ser. No. 09/332,242 filed Jun. 14, 1999.

TECHNICAL FIELD

The present invention has to do with the features of a status LED indicator. More particularly, this invention describes a new and useful sleep-mode status indicator system for laptop computers.

BACKGROUND ART

Saving electrical power has been a very important goal ever since the birth of battery-operated portable devices. For example, for laptop computers, one efficient way is to apply battery power only to the parts of a device in use, and at the same time to withhold power from those parts of a device not in use. The early portable devices, however, had a simple ON/OFF arrangement in which full battery power was available for use when the devices were ON and the battery power was completely shut off when the devices were OFF. Information such as re-usable software programs and data saved in the semiconductor memories became lost once the devices were turned OFF. To use the programs and data again, additional power and time must be used to load them back into the semiconductor memories. Some later portable device used non-volatile semiconductor memories so that the saved information remains intact even when the devices were turned OFF; some other portable devices used stand-by power adapted to keep the memories refreshed when the devices were OFF.

Today's laptop computers have complicated circuitry because of their additional peripheral units such as floppy disk, hard disk, PCMCIA and CD drives. To efficiently manage the use of electrical power, arrangements have been devised to monitor various functions inside a laptop computer. The computer is intelligent enough to apply battery power only to internal circuits and sub-systems that are deemed 'in use' and at the same time to withhold power from those circuits and sub-systems that are deemed 'idle'. Sometimes the power is not completely withheld from the 'idle' circuitry but the power supply is merely reduced due to its entry into a low power consumption mode. Either way, the power management arrangement inside the laptop computer maximizes the computer's power savings and lengthens the duration the laptop computer can operate using batteries.

The electrical state of the computer when the power management arrangement deprives or reduces electrical power supplied to the 'idle' circuitry and sub-systems is generally referred to as the sleep mode. During sleep mode, the arrangement further monitors the activities in the computer in order that power can be applied immediately when needed. One way a laptop computer enters into the sleep mode is through user inaction. For example, when there is no user key entry for a pre-determined duration, display circuitry and related-subsystems are then shut off, and relevant programs and data are saved. Another way is through user issuance of a sleep command, and another way is through the detection of battery charge below a set level.

To awaken the computer from sleep mode, a typical way is by pressing any key on the keyboard. In this manner, relevant programs and data need not be re-loaded from hard disk and power to an otherwise idle display is conserved.

A sleep-mode indicator typically identifies to users that the laptop computer is in sleep mode. One such indicator is a blinking LED (light emitting device) located on a computer housing for convenient observation. For example, a typical sleep-mode indicator for Apple Macintosh PowerBook® computers is a blinking LED indicator subjected to identical electrical energy pulses at about one second apart and for a duration of about 40 msecs. FIG. 1 is a waveform chart that illustrates the identical electrical pulses that generate a prior art sleep-mode indicator blinking effect for the laptop computers. In this chart, the LED is driven with 6 mA of current for 40 msecs once a second.

Unfortunately, the LED blinking effect resulting from a once a second, identical electrical energy pulses does not provide the best pattern that is visually appealing to the users. A better and more improved status LED indicator is needed. More particularly, a better and more improved sleep-mode indicator system is therefore needed and duly described herein.

SUMMARY OF THE INVENTION

Therefore, it is an aspect of the present invention to provide a better and more improved status LED indicator. It is another aspect of the invention to provide a sleep-mode indicator for an electronic device such as a laptop computer that the indicator generates a visually appealing blinking pattern to the users. It is another aspect of the present invention to provide a LED blinking pattern along with varied intensity that in combination mimics the rhythm of breathing. It is yet another aspect of the present invention to provide an electrical apparatus that generates a sleep-mode indicator blinking pattern based on a sinusoidal function using PWM (pulse width modulation) designs.

BRIEF DESCRIPTION OF THE DRAWINGS

A better understanding of the present invention can be obtained by considering the following detailed description taken together with the accompanying drawings that illustrate preferred embodiments of the present invention in which.

DETAILED DESCRIPTION OF THE PREFERRED EMBODIMENTS

With today's advances in technology, the design of specialized integrated circuits (e.g., micro-controllers) and programmable logic generally do not require the rendering of fully detailed circuit diagrams. The definition of electronic functionality and electrical waveforms allow computer design techniques to design the desired logic and circuits. Accordingly, portions of the present invention will be described primarily in terms of functionality to be implemented by a micro-controller and other associated electronic components. This functionality will be described in detail with the accompanying drawings. Those of ordinary skill in the art, once given the following descriptions of the various functions to be carried out by the present invention will be able to implement the necessary micro-controller structure and circuit waveforms in suitable technologies without undue experimentation.

Figure 2:
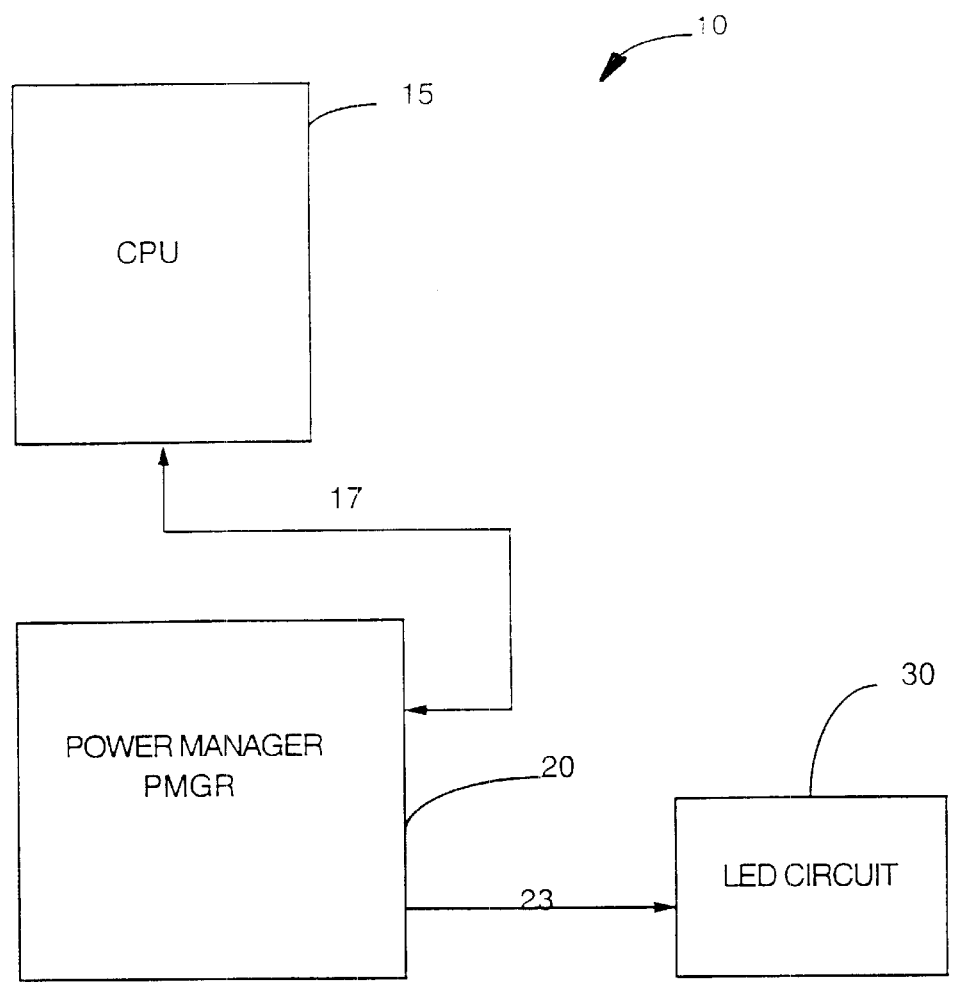
FIG. 2 is a functional block diagram of the parts of a laptop computer generally pertaining to the power management function of the present invention.

Referring to FIG. 2, a simplified overview of a partial laptop computer system 10 that is related to the present invention is shown in functional block diagram format. While FIG. 2 is useful for providing an overall description of the sleep-mode indicator system of the present invention, a number of details of the system are not shown. As necessary for disclosure of the present invention, further detail is set forth with reference to other figures provided with this specification.

The partial laptop computer system 10 includes a CPU 15, a micro-controller power manager (PMGR) 20 and a LED circuit 30. The CPU 15 is electrically coupled to PMGR 20 via line 17. The LED circuit 30 is electrically coupled to PMGR 20 via line 23. The lines 17 and 23 each may represent a collection of electronic lines adapted to ensure the proper working of the laptop computer. The LED circuit 30 includes a LED (not shown here) and an associated circuit (not shown) for generating a sleep mode status indicator signal which may cause a LED blinking effect. Depending on the design, it is possible to incorporate the associated circuit for the LED blinking effect inside the PGMR 20. The PMGR 20 is an intelligent assistant to the CPU 15, wherein PMGR 20 may monitor the state of charge of battery, control the power usage of the various subsystems or may even interface to I/O devices such as a modem or a serial card. PGMR may consist of or be a portion of an ASIC.

The main processor for the laptop computer system 10 is the CPU 15. During sleep mode, the CPU 15 may become inactive and enter into a low-power consumption mode. For example, to minimize power usage, power or the clock signal to the CPU 15 may be turned OFF or the clock frequency feeding to the CPU 15 might be reduced. Further, once the computer goes to sleep, the PMGR 20 takes over the bulk of the sleep mode processing tasks. One of the tasks PMGR 20 does at the start of the sleep mode is to immediately turn the LED circuit 30 ON. As a result, the LED circuit 30 generates and display a sleep mode status indicator signal so that the LED might be blinking on the housing of the laptop computer to indicate to users that this computer is now in sleep mode.

Figure 3:
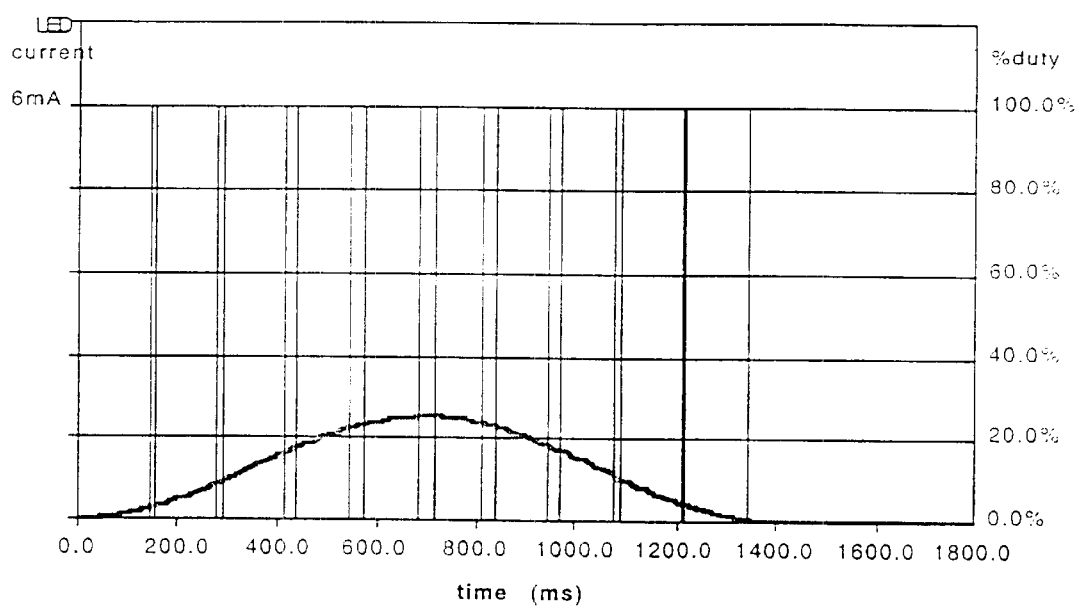
FIG. 3 is a chart that illustrates a simplified view of the electrical pulses that energize the sleep-mode indicator system according to a preferred embodiment of the present invention; also, it is superimposed with a sinusoidal duty cycle function for the purpose of pulse width modulation.

FIG. 3 is a chart that illustrates a simplified view of the electrical pulses that energize the sleep-mode indicator system according to a preferred embodiment of the present invention; also, it is superimposed with a sinusoidal duty cycle function for the purpose of pulse width modulation. In this manner, the present invention would be better appreciated and readily understood.

The electrical pulses as shown in FIG. 3 have varied pulse widths because of the operation of PWM, and their actual pulse widths depend on the associated sinusoidal duty cycle function. The PWM frequency used in this embodiment is 125 Hz. In fact, preferred frequencies include any frequency sufficiently greater than that can be effectively distinguished by the human eye. However, power consideration for portable devices further prefer PWM frequencies to range within, for example, 100–200 Hz. The peak current is 6 mA as demonstrated by the vertical axis on the left of the chart, and it remains the same as that in FIG. 1. The electrical pulses in FIG. 3 are simplified in that not all of the pulses are shown. A PWM frequency of 125 Hz in the present invention denotes one electrical pulse in a period of 8 msecs. The timing scale for FIG. 3 is chosen for the ease of comparison with FIG. 1, and therefore, only representative pulses are shown in the chart.

The human eye, a relatively slow sensory device, in effect integrates these pulses giving the sensation of changing intensity. It was determined through experiment that increasing the duty cycle according to a non-linear function gives the most pleasing visual effect while a simple linear ramp does not seem as natural. A preferred sinusoid duty cycle function is shown in FIG. 3. It is measured by the duty cycle axis on the right of the chart. It is a positively-biased sinusoid function having its maximum at about 25% duty cycle and its minimum at 0% duty cycle. This duty cycle indicates the percentage of a 8 msec period an electrical pulse is to stayed at its peak current level. For example, an electrical pulse 50 in the chart has its rising edge coinciding with the peak of the sinusoidal function at 25% duty cycle. Thus, pulse 50 has a pulse width of 2 msecs. In this manner, all electrical pulses for the LED circuit 30 have varied pulse widths in accordance with the values of sinusoidal function at the time of their occurrences. For clarity, the pulse widths of the pulses in FIG. 3 are expanded and are not drawn to scale.

Figure 1:
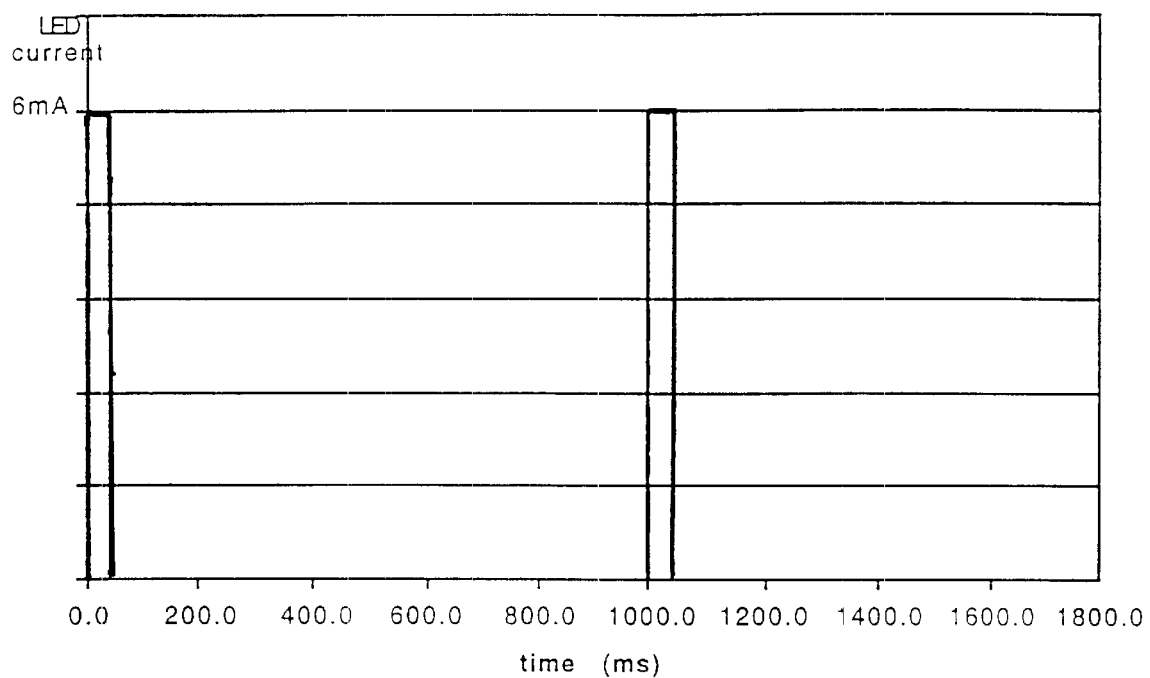
FIG. 1 is a chart that illustrates the identical electrical pulses that generate a prior art sleep-mode indicator blinking effect for laptop computers.

The sinusoidal function of the present invention may further include a quiet period during which the function value remains at 0% duty cycle. The chart in FIG. 3 demonstrates the quiet period ranging from 1400 msecs to 1800 msecs. This quiet period conserves electrical power because during which no electrical pulses occur. Clearly, the longer the duration of the quiet period, the more power savings occur; however, a preferred period duration is about 0.4 second. In essence, the varying intensity of the electrical pulses in combination with a quiet period provides a preferred visual experience for users. Further, the blinking effect of the sleep-mode indicator in accordance with the present invention mimics the rhythm of breathing which is psychologically appealing and superior than the LED effect of the waveforms as shown in FIG. 1. Altogether, a preferred overall 'breathing' periodicity is about 1.8 seconds.

As mentioned earlier about FIG. 1, PMGR 20 is an intelligent assistant to the CPU 15, and it may incorporate any PWM circuit that generates the waveforms disclosed in FIG. 3. Alternatively, the LED circuit 30 may include a micro-controller structured separately from the PMGR 20. For example, such a micro-controller would include PIC12C508A (not shown). Again, the definition of electronic functionality and electrical waveforms allow typical computer design techniques to design the desired logic and circuits in the PMGR 20. Broadly speaking, this status LED indicator may be a member of any electronic device that has a need for status indication, and it is clearly not limited singly to sleep mode status indication for laptop computers.

The foregoing description of preferred embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

We claim:

1. A sleep mode indicator apparatus for a laptop computer, said apparatus indicating to users that said laptop computer being in sleep mode, said apparatus comprising:
   a CPU for causing said computer to enter into sleep mode;
   a micro-controller coupled to said CPU for computer operations during sleep mode;
   a LED circuit coupled to said micro-controller for generating electrical pulses to energize a LED indicator, said electrical pulses including a repetition of a series of PWM pulses occurring at a frequency, each pulse having an identical peak current level, said electrical pulses further including pulse Widths varying in accordance with a non-linear duty cycle function.

2. An apparatus as claimed in claim 1 wherein said non-linear duty cycle function includes a positively-biased sinusoidal function.

3. An apparatus as claimed in claim 2 wherein said sinusoidal function includes a quiet period during which the function value remains at 0% duty cycle.

4. An apparatus as claimed in claim 3 wherein said sinusoidal function has numerical duty cycle values over the period of said repetition.

5. An apparatus as claimed in claim 4 wherein said repetition has a period of approximately 1.8 seconds.

6. An apparatus as claimed in claim 2 wherein said sinusoidal repetition has a peak value of 25% duty cycle.

7. An apparatus as claimed in claim 2 wherein said frequency for said series of PWM pulses ranges from 100 to 200 Hertz.

8. A status indicator apparatus for an electronic device, said apparatus indicating to users of said computer a certain status, said apparatus comprising:
   a micro-controller; and
   a LED circuit coupled to said micro-controller for generating electrical pulses to energize a LED indicator, said electrical pulses including a repetition of a series of PWM pulses occurring at a frequency, each pulse having an identical peak current level, said electrical pulses further including pulse widths varying in accordance with a non-linear duty cycle function, said non-linear function including a positively biased sinusoidal function having a quiet period during which the function value remains at zero.

9. A sleep mode indicator apparatus for a laptop computer, said apparatus indicating to users of said computer that it being in sleep mode, said apparatus comprising:
   a CPU for causing said computer to enter into sleep mode;
   a micro-controller coupled to said CPU for computer operations during sleep mode;
   a LED circuit coupled to said micro-controller for generating electrical pulses to energize a LED indicator, said electrical pulses including a repetition of a series of PWM pulses occurring at a frequency, said frequency ranging from 100 to 200 Hertz, each pulse having an identical peak current level, said electrical pulses further including pulse widths varying in accordance with a non-linear duty cycle function, said non-linear function including a positively biased sinusoidal function having a peak value less than 100% duty cycle, said sinusoidal function further including a quiet period during which the function value remains at zero.

* * * * *